United States Patent
Ewert

(10) Patent No.: US 10,860,024 B2
(45) Date of Patent: Dec. 8, 2020

(54) CONTROL SYSTEM FOR AN AUTONOMOUS VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 16/045,109

(22) Filed: Jul. 25, 2018

(65) Prior Publication Data

US 2019/0033865 A1    Jan. 31, 2019

(30) Foreign Application Priority Data

Jul. 26, 2017   (DE) .......................... 10 2017 212 835

(51) Int. Cl.

| | |
|---|---|
| *G05D 1/00* | (2006.01) |
| *G06K 9/00* | (2006.01) |
| *G06K 9/62* | (2006.01) |
| *B60W 30/00* | (2006.01) |
| *G06N 3/08* | (2006.01) |
| *G06N 3/04* | (2006.01) |

(52) U.S. Cl.
CPC ........... *G05D 1/0088* (2013.01); *B60W 30/00* (2013.01); *G06K 9/00805* (2013.01); *G06K 9/00818* (2013.01); *G06K 9/6256* (2013.01); *G06N 3/08* (2013.01); *G06N 3/04* (2013.01)

(58) Field of Classification Search
CPC ............. G05D 1/0088; G06K 9/00805; G06K 9/00818; G06K 9/6256; B60W 30/00; G06N 3/08

USPC .......................................................... 701/27
See application file for complete search history.

(56) References Cited

U.S. PATENT DOCUMENTS

| | | | |
|---|---|---|---|
| 5,548,512 A | * | 8/1996 | Quraishi .............. G05D 1/0255 701/23 |
| 10,445,599 B1 | * | 10/2019 | Hicks ................. G06K 9/00805 |
| 2017/0135621 A1 | * | 5/2017 | Lee ........................ A61B 5/163 |
| 2017/0312614 A1 | * | 11/2017 | Tran ....................... G06K 9/208 |

(Continued)

FOREIGN PATENT DOCUMENTS

| | | |
|---|---|---|
| DE | 10149206 A1 | 2/2003 |
| DE | 102012008978 A1 | 11/2013 |

(Continued)

*Primary Examiner* — Yazan A Soofi
(74) *Attorney, Agent, or Firm* — Norton Rose Fulbright US LLP; Gerard Messina

(57) ABSTRACT

A control system for an autonomous vehicle, including at least one artificial intelligence module, or AI module, which converts input variables into output variables through a parameterized internal processing chain, the parameters of the processing chain being capable of being configured, in a training phase, in such a way that training values of the input variables are converted into the corresponding training values of the output variables, at least one first AI module, which supplies output variables for carrying out a first driving maneuver, and a second AI module, which supplies output variables for carrying out a second driving maneuver, and/or at least one first AI module that is designed to recognize a first object or a first group of objects and a second AI module that is designed to recognize a second object or a second group of objects, being provided.

12 Claims, 3 Drawing Sheets

(56) References Cited

U.S. PATENT DOCUMENTS

2017/0368051 A1* 12/2017 Atuegbu ............... C07D 401/06
2017/0371348 A1* 12/2017 Mou ....................... G01S 17/86
2018/0081362 A1*  3/2018 Linke ............... G08G 1/096741
2018/0136332 A1*  5/2018 Barfield, Jr. ............... G06T 7/70
2018/0203113 A1*  7/2018 Taylor .................... G01S 17/86

FOREIGN PATENT DOCUMENTS

| DE | 102015200025 A1 | 7/2016 |
| DE | 102016000493 A1 | 7/2017 |
| WO | 2017062106 A1 | 4/2017 |

* cited by examiner

CONTROL SYSTEM FOR AN AUTONOMOUS VEHICLE

CROSS REFERENCE

The present application claims the benefit under 35 U.S.C. § 119 of German Patent Application No. DE 102017212835.6 filed on Jul. 26, 2017, which is expressly incorporated herein by reference in its entirety.

FIELD

The present invention relates to a control system for an autonomous vehicle that is equipped with a trainable artificial intelligence.

BACKGROUND INFORMATION

Driving a vehicle in traffic is a complex process that has to be learned by a human driver through practical experience in driving lessons. It is correspondingly difficult to capture this control task in program code for an autonomous control system. Therefore, artificial intelligence, or AI, is used for this purpose, which, analogous to the human learning process, derives unconscious rules for the control task from training data, and subsequently converts the input variables ascertained by a sensor system of the vehicle into the correct output variables for an actuator system.

U.S. Pat. No. 5,548,512 A describes a simple autonomously driving robot vehicle that is equipped with an AI in order to ascertain its position in a limited surrounding working environment. Separate AI modules are provided for the respective ascertaining of an x-coordinate and a y-coordinate in the plane, as well as an angle of rotation.

In order to take part in street traffic, significantly more input variables and output variables are relevant than is the case for travel in a limited working environment, and there are also more necessary conditions that have to be observed under all circumstances and that each link a large number of input and output variables to each other. Therefore, the trend is towards implementing the complete control task as a single monolithic AI module, and training this module with a large number of real driving situations. Examples of corresponding control systems and the respective training process are described in U.S. Patent Application Publication No. US 2017/135,621 A1 and in PCT Application No. WO 2017/062106 A1.

SUMMARY

In the context of the present invention, a control system for an autonomous vehicle is provided. This control system includes at least one artificial intelligence module, or AI module, which converts input variables into output variables via a parameterized internal processing chain. The parameters of the processing chain are configurable, in a training phase, in such a way that training values of the input variables are converted to the corresponding training values of the output variables.

At least one first AI module that supplies output variables for carrying out a first driving maneuvers, and a second AI module that supplies output variables for carrying out a second driving maneuver, are provided. Alternatively, or also in combination, at least one first AI module that is designed to recognize a first object or a first group of objects, and a second AI module that is designed to recognize a second object or a second group of objects, are provided. In the latter case, the output variables indicate for example probabilities that a particular object has been recognized.

It has been found that the monolithic realization of an AI for autonomous driving makes retroactive modifications, for example when there are changes in traffic signs or other traffic rules, significantly more difficult, and moreover non-transparent. The unconscious rules generated from the training data are stored in the AI in a form that is not readable for humans and cannot be selectively adapted. Instead, the normal training process has to be entirely or partly repeated, and here there is also always a risk that the behavior of the control system will change in some aspects in an entirely unintended manner.

The provided functional separation first of all creates an additional outlay, because each individual AI module has to be trained separately. On the other hand there is the great advantage that subsequent modifications always affect only a part of the functionality, and are correspondingly simplified. The individual AI modules can also operate on hardware having smaller dimensions. The realization of an overall scope of functionality in a plurality of small AI modules can result in hardware costs that are lower overall than is the case for the realization of a larger-dimensioned hardware for a monolithic AI, especially because the resource outlay for the training of an AI module increases in strongly nonlinear fashion as the complexity of the module increases. In the case of a defect, the repair costs are lower, because on the one hand the defective module can be quickly located due to the functional separation, and on the other hand the required replacement part is significantly lower in cost. Finally, the functional separation also makes it possible to reuse AI modules and the training results stored therein, thus saving training expense.

For example, a first AI module can be provided for left turns, and a second AI module can be provided for right turns. If, for example, the regulation currently in effect in Germany, that two vehicles turning left that are approaching one another are to turn in front of each other, is modified, then only the AI module for left turns has to be retrained. The AI module for right turns remains unmodified. In a monolithic AI, such undesirable modifications cannot be excluded.

Similar considerations hold for example for object recognition from camera data of the vehicle. If, for example, a first AI module is responsible for recognizing traffic signs and a second AI module is responsible for recognizing other traffic participants, then for example the new introduction of the traffic sign for environmental or "green" zones will require only a new training of the first AI module, and this at the same time provides assurance that the safety-critical recognition of other traffic participants will remain unmodified. This cannot be guaranteed in a monolithic AI.

The limited effects of modifications thus also reduce the outlay for the granting of permissions for street traffic. In particular, functionality can also be retrofitted without making the permission for the existing functionality invalid.

In a particularly advantageous embodiment of the present invention, in addition a third AI module is provided that supplies output variables for the transition from the first driving maneuver to the second driving maneuver. This means that the smooth transition from the first driving maneuver to the second driving maneuver is trainable separately in the vehicle, and this training in turn has no influence on the maneuvers themselves. In this way, a smooth transition is ensured between driving maneuvers, in particular even given a more complex chaining of three or more driving maneuvers. In monolithic AI according to the existing art up to now, there is no functional separation between the actual driving maneuvers on the one hand and transitions between these driving maneuvers on the other hand. Instead, in order to produce the smooth transition, the driving maneuvers themselves are adapted to each other, which however can cause discontinuities when there is a further transition to a third driving maneuver.

In a further particularly advantageous embodiment of the present invention, at least one AI module, or at least one group of AI modules, is designed to convert normalized input variables into normalized output variables. An interface layer is then additionally provided that is designed to convert normalized output variables into input variables of an actuator system of the vehicle, and to convert output variables of a sensor system of the vehicle into normalized input variables. In this way, the functionality of the concrete vehicle platform can be abstracted. The AI module is thus equally usable for a plurality of vehicle platforms, and is adapted to the particular vehicle platform in each case by the interface layer.

For example, an AI module can be designed to recognize traffic signs and other objects in a vectorized camera image that is independent of the type and resolution of the camera used. The interface layer is then responsible for vectorizing the pixel image obtained by the camera. Measurement variables as input variables can also for example be normalized to a specified numeric interval (for example between 0% and 100%). The interface layer is then responsible for, for example, converting the signal of a sensor for the measurement variable into the normalized input variable.

The same holds for the output variables. Thus, for example, the gas position or the braking force can also be normalized to an interval between 0% and 100%, and the steering angle can for example be normalized to an interval between −100% for maximum left and +100% for maximum right. The magnitude of the gas position, the braking force, and the steering angle, in absolute units, is specific to the respective vehicle platform. The interface layer carries out the conversion.

Here, in a further particularly advantageous embodiment of the present invention, the interface layer can be designed in particular as an additional AI module. In this way, the adaptation to a new vehicle platform can be made self-training, without requiring detailed knowledge about the sensor system or actuator system. Subsequent adaptations through a new training of only the interface layer are also easy to bring about. For example, it may occur that a sensor for a measurement variable whose signal changes in linear fashion with the value of the measurement variable is exchanged for a higher-value sensor whose signal is a non-linear function of the value of the measurement variable. With the new training of the interface layer, this change can be done without having to change anything in the further processing chain of the obtained measurement value. The interface layer can for example be trained by carrying out particular driving maneuvers.

However, the interface layer does not have to be a separate AI module, but for example can also be designed as the input layer or output layer of another AI module. In the training of the interface layer, modifications can then for example be limited to this layer, while the rest of the processing chain is held constant.

The possibility of making AI modules smaller in terms of hardware in turn makes it possible to increase the ease of repair of the control system. For this purpose, in a further particularly advantageous embodiment of the present invention, at least one AI module is integrated in a sensor assembly that provides the input variables of this AI module, and/or is integrated in an actuator assembly that receives the output variables of this AI module.

For example, the AI module responsible for recognizing traffic signs can be installed with the associated camera in a sensor assembly. If it turns out that the recognition is no longer functioning reliably, then the error can only lie either in the camera or in the associated AI module. Thus, the error can be corrected quickly for the end user in a repair shop or in a roadside assistance context, by exchanging the sensor assembly. A detailed analysis and repair of the sensor assembly can then be carried out later, if it makes sense financially to do so.

In case of a breakdown, due to the functional separation it is in addition known which driving maneuvers will not function until repair is made, and thus may be dangerous. These driving maneuvers can then for example be prevented and replaced by combinations of other properly functioning driving maneuvers. In this way, the vehicle may then still be able to reach a workshop under its own power.

In a further particularly advantageous embodiment of the present invention, at least two AI modules are provided that supply output variables for carrying out one and the same driving maneuver and/or that are designed to recognize one and the same object or one and the same group of objects, the input variables of the two AI modules being different. In this way, the output variables supplied by the two AI modules can be plausibilized relative to one another, which increases operational reliability. In a monolithic AI, in contrast, the first processing branch, which generates the output variables from the first set of input variables, and the second processing branch, which generates the output variables from the second set of input variables, are not completely independent of one another.

In a further particularly advantageous embodiment of the present invention, the totality of the objects to be recognized by the control system are divided among AI modules in such a way that a recognition of a first object by a first AI module is contradictory to the recognition of a second object by a second AI module. In this way, a further level of plausibilization is included, which increases operational reliability.

Thus, for example the first AI module can be designed to recognize those traffic signs that confer right of way (for example "road with right of way" or "right of way at the next intersection"), while the second AI module is designed to recognize those traffic signs that take away right of way (for example "yield right of way," "stop," or "right before left"). If both AI modules simultaneously report a recognition with high probability, there is an error.

In a further particularly advantageous embodiment of the present invention, at least one communication interface is provided for acquiring the parameters of the processing chain for at least one AI module from another vehicle or from an external computer. Due to the functional separation on the one hand and the possible abstraction from the vehicle platform on the other hand, these parameters, which embody the training results obtained during the training of the AI module, are no longer bound to a concrete vehicle. In this way, for example training results from a vehicle that has already traveled significantly more miles can be transferred to newer vehicles.

In addition, a fast repair is possible when there are problems. For example, it may happen that particular maneuvers, for example passing maneuvers, can no longer be properly carried out by an AI module, resulting in critical situations. In this case, a correction is made of precisely this AI module, so that this AI module again functions properly for this driving maneuver after the correction. The detection of a faulty driving maneuver can for example be detected through a driver intervention, or through the comparison of a target trajectory with an actual trajectory of the vehicle in the vehicle itself or in the cloud.

In this exemplary embodiment, the faulty AI module is replaced by a functioning AI module, in that the parameters of the processing chain are taken over by the properly functioning AI module. These parameter data can for example originate from another vehicle, or they can for example be transferred to the autonomous vehicle from the cloud (car-to-X communication). The new parameters here overwrite the old parameters, i.e. effectively the old AI module, for the corresponding driving maneuver on the autonomous vehicle. It is important that the new AI module exist as abstractly as possible so that it can be transferred directly to the new vehicle.

After the transfer of the new parameters of the processing chain, the corresponding vehicle can advantageously carry out an adaptation of the interface layer realized as a separate AI module, so that the new AI module, loaded in the form of new parameters, is also compatible with the drives and sensors of the vehicle, and the corresponding driving maneuver can also continue to be carried out by the vehicle. The training of the AI module for the interface can for example be carried out in the shortest time by carrying out particular driving maneuvers, as well as controlling the actuators of the vehicle. In this way, the correction of an AI module of an autonomous vehicle is easily possible.

In a particularly advantageous embodiment of the present invention, at least one AI module is realized as an artificial neural network, ANN. In such a neural network, artificial neurons, which behave analogously to neurons in the human brain, are organized into an input layer, which receives the input variables, an output layer, which outputs the output variables, and one or more "deep" or "hidden" layers situated between them. Here, the transitions from a neuron in a layer to the neurons in adjacent layers are each assigned probabilities. In such a neural network, even very complex relationships between input variables and output variables can be modeled; the price for this is that the probabilities stored in the network are not interpretable by humans in the context of the task to be performed. Thus, it is not easily foreseeable how the behavior of the network as a whole will change when a particular probability is changed. The functional separation and abstraction reproduces precisely this transparency, at least in part, and in particular enables reliable inferences as to what does and does not change in the overall system when there are changes to an AI module.

In a further particularly advantageous embodiment of the present invention, the AI modules are implemented on a distributed computing architecture in the vehicle. In this way, the hardware resources of the vehicle are better exploited. In addition, the operational reliability is increased, because random hardware errors can affect only a part of the functionality. In addition, some, or also all, AI modules can be implemented redundantly on different computing parts of the vehicle. The redundantly realized AI modules can be plausibilized relative to one another particularly easily.

According to the features described above, the functional separation and abstraction of the AI modules of the concrete vehicle also make it possible to decouple the actual training of the AI modules from the vehicle. This training can for example take place in the cloud. Thus, the present invention also relates to a method for producing a control system according to the present invention in which training values of the input variables and training values of the output variables for at least one AI module are transferred from the vehicle to an external computer outside the vehicle, and/or to another vehicle, and the parameters of the processing chain for the AI module are ascertained on the external computer, or at the other vehicle.

The control system and the method can be implemented entirely or partly in software. This software can also for example be purchased as an update or add-on for an existing control system, and to that extent is a stand-alone product. The present invention therefore also relates to a computer program having machine-readable instructions that, when they are executed on a computer and/or on a control system, upgrade the computer and/or the control system to a control system according to the present invention and/or cause them to carry out the method according to the present invention. The present invention also relates to a machine-readable data carrier or to a download product having the computer program.

Further features and improvements of the present invention are described below, together with the description of the preferred exemplary embodiments of the present invention, on the basis of figures.

DETAILED DESCRIPTION OF EXAMPLE EMBODIMENTS

Figure 1:
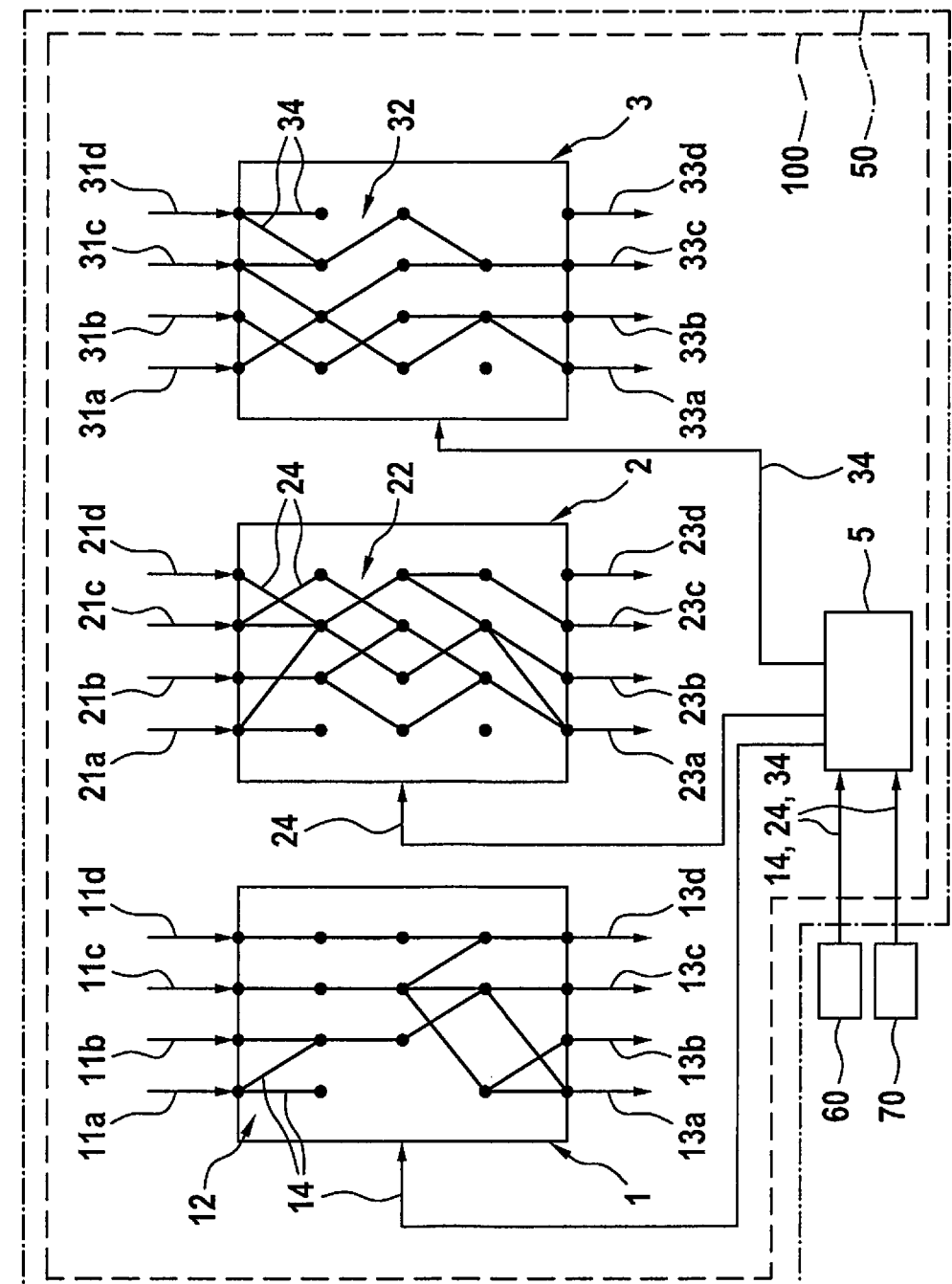
FIG. 1 shows an exemplary embodiment of control system 100 in vehicle 50.

According to FIG. 1, control system 100 contains three AI modules 1, 2, and 3, first AI module 1 ascertaining, on the basis of input variables 11*a*-11*d*, output variables 13*a*-13*d* for carrying out a first driving maneuver, and second AI module 2 ascertaining, on the basis of input variables 21*a*-21*d*, output variables 23*a*-23*d* for carrying out a second driving maneuver.

Third AI module 3 ascertains, on the basis of input variables 31*a*-31*d*, output variables 33*a*-33*d* for the smooth transition from the first driving maneuver to the second driving maneuver.

The three AI modules 1, 2, and 3 each have an internal processing chain 12, 22, or 32, whose connections are defined by parameter sets 14, 24, or 34. If AI modules 1, 2, and 3 are realized as neural networks, these parameter sets can for example designate probabilities that an event is forwarded along a connection further in the direction of the output, i.e. from top to bottom in the perspective shown in FIG. 1.

Parameter sets 14, 24, and 34 can be acquired, via a communication interface 5, from another vehicle 60 (car-to-car communication, C2C) or also from an external computer 70 (car-to-infrastructure communication, C2I).

Figure 2:
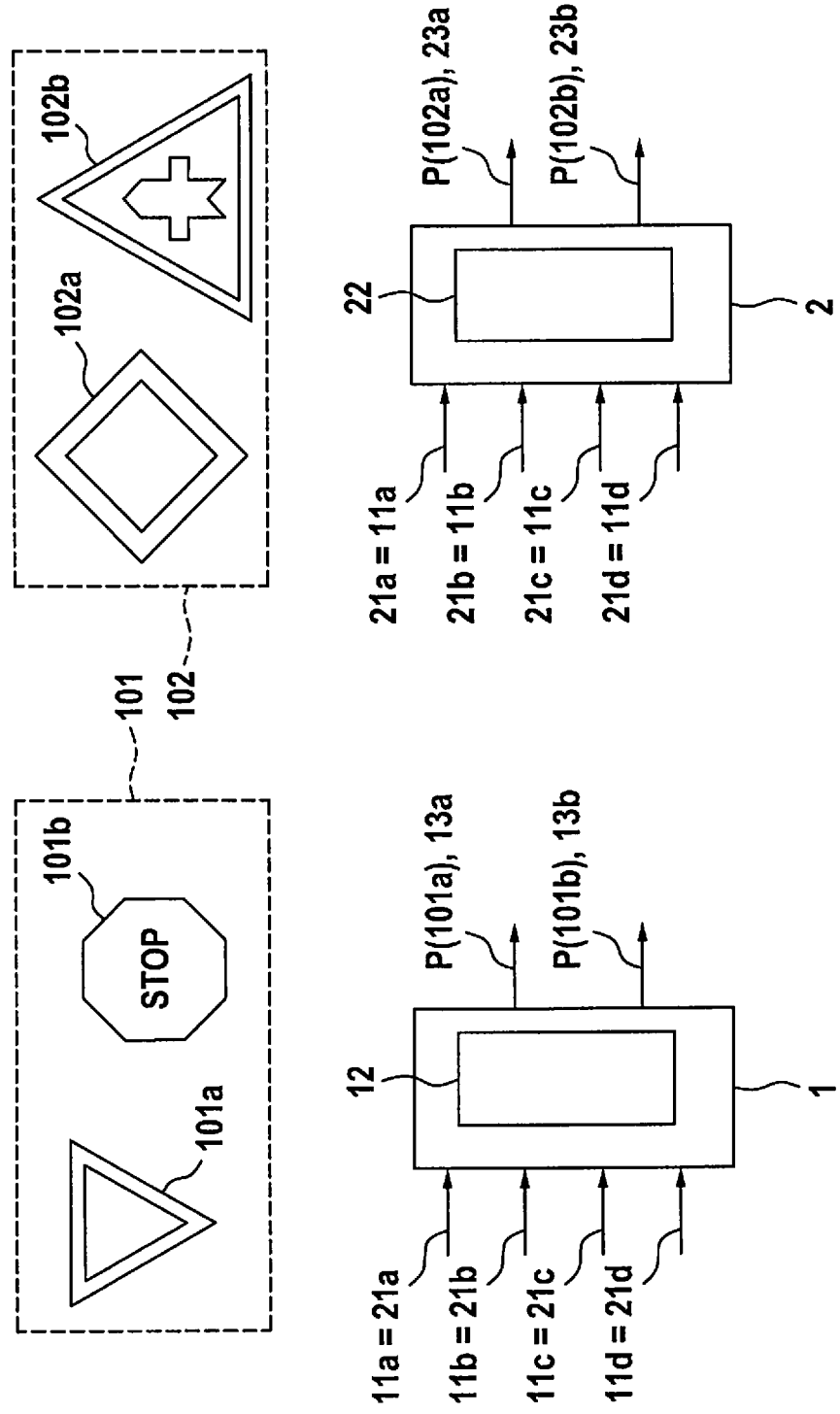
FIG. 2 shows the recognition of various object groups 101, 102, having separate AI modules 1, 2.

FIG. 2 shows an example of how the responsibility for the recognition of various groups 101, 102 of objects can be appropriately divided between two AI modules 1 and 2. First group 101 contains traffic signs that take away right of way, here a sign "yield right of way" 101*a* and a stop sign 101*b*. Second group 102 contains traffic signs that confer right of way, here a sign "road with right of way" 102*a* and a sign "right of way at the next intersection" 102*b*.

First AI module 1 contains for example camera data as input variables 11*a*-11*d*, and ascertains, via its internal processing chain 12, probabilities P(101*a*) or P(101*b*) that traffic sign 101*a*, or 101*b*, has been recognized in the camera data, as output variables 13*a* or 13*b*.

Analogously, second AI module 2 receives the same camera data as input variables 21*a*-21*d*, and ascertains, via its internal processing chain 22, probabilities P(102*a*) or P(102*b*) that traffic sign 102*a* or 102*b* has been recognized in the camera data, as output variables 23*a* or 23*b*.

The division between the two AI modules is chosen such that a contradiction arises if the first AI module 1 has recognized, with high probability, a traffic sign 101*a*, 101*b* from first group 101 and at the same time second AI module 2 has also recognized, with high probability, a traffic sign 102*a*, 102*b* from second group 102. Traffic signs from the two groups 101 and 102 mutually exclude one another; that is, they are never found at the same location. By monitoring the occurrence of such contradictions, the two AI modules 1 and 2 can be plausibilized relative to one another without having to create complete redundancy for this purpose.

Figure 3:
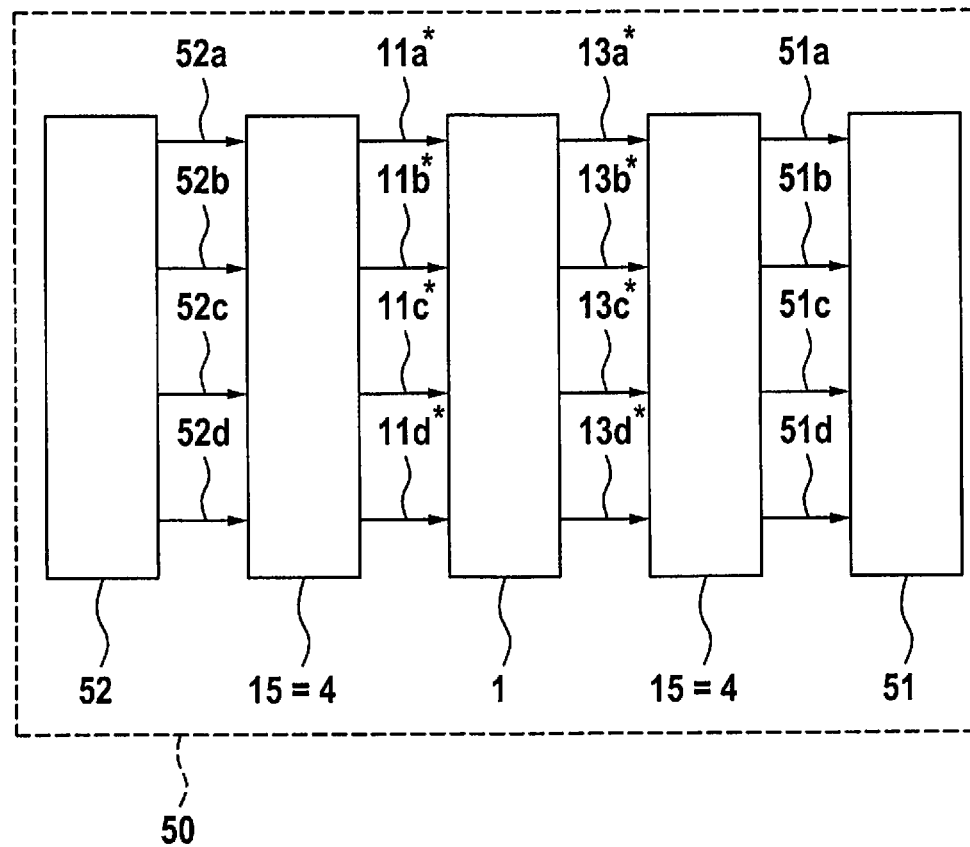
FIG. 3 shows an abstraction of an AI module 1 from the platform of vehicle 50, having an interface layer 15 realized as a further AI module 4.

FIG. 3 shows, as an example, the abstraction of an AI module 1 from the platform of vehicle 50. AI module 1 receives normalized input variables 11*a-11*d and from these ascertains normalized output variables 13*a-13*d. Independent of the vehicle 50 on which AI module 1 is being used, input variables 11*a-11*d, or output variables 13*a-13*d, are always in the same range of values.

Vehicle 50 has a sensor system 52 that outputs the output variables 52*a*-52*d*. These output variables 52*a*-52*d* are converted, by interface layer 15, into the normalized input variables 11*a-11*d of AI module 1. Analogously, interface layer 15 also converts the normalized output variables 13*a-13*d of AI module 1 into input variables 51*a*-51*d* of actuator system 51 of vehicle 50. Interface layer 15, which is realized as an additional AI module 4, is present only once, but is shown twice in FIG. 3 for reasons of clarity.

Figure 4:
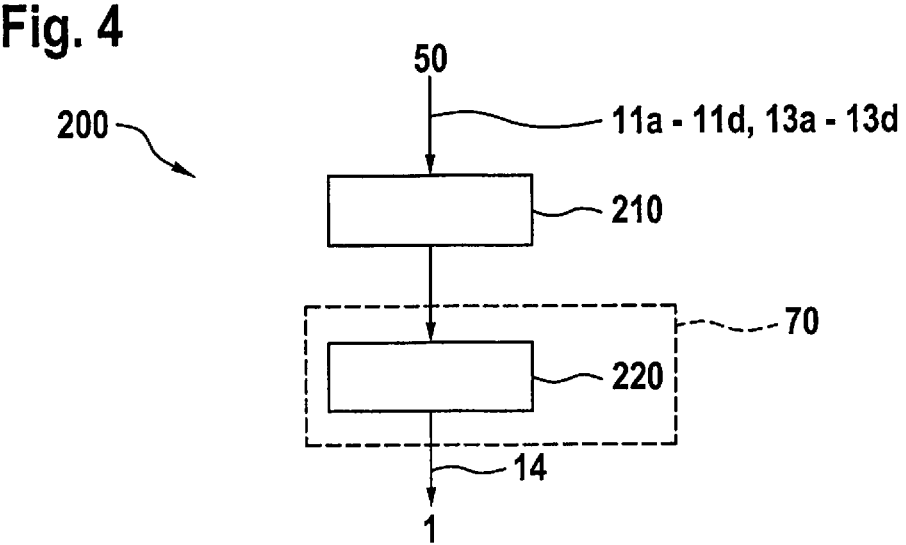
FIG. 4 shows an exemplary embodiment of method 200.

FIG. 4 schematically shows an exemplary embodiment of method 200 with which control system 100 can be provided with parameters 14 for a single AI module 1, here shown as an example. From vehicle 50, training values of input variables 11*a*-11*d* are related to the associated output variables 13*a*-13*d*.

The training values of input variables 11*a*-11*d* and the associated training values of output variables 13 *a*-13*d* are communicated to an external computer 70 in step 210. At external computer 70, in step 220 parameters 14 of processing chain 12 of AI module 1 are ascertained. These can then be communicated to AI module 1 in any desired manner.

This training outside vehicle 50 is an advantageous option provided by the functional separation and abstraction. However, in the control system according to the present invention it also remains possible to train the parameters 14 of processing chain 12 in vehicle 50 itself, in the standard manner.

What is claimed is:

1. A control system for an autonomous vehicle, comprising:
at least one artificial intelligence (AI) module to convert input variables into output variables through a parameterized internal processing chain, parameters of the processing chain being capable of being configured, in a training phase, so that training values of the input variables are converted into the corresponding training values of the output variables, wherein the at least one AI module includes at least one of: (i) at least one first AI module of the at least one AI module to supply output variables, based on a first set of input variables, for carrying out a first driving maneuver, and a second AI module of the at least one AI module to supply output variables, based on a second set of input variables, for carrying out a second driving maneuver, and (ii) at least one first AI module to recognize a first object or a first group of objects and a second AI module to recognize a second object or a second group of objects; wherein the at least one AI module includes one of: (a) at least one AI module, or (b) at least one group of AI modules, which is configured to convert normalized input variables into normalized output variables; and
an interface layer to convert normalized output variables into input variables of an actuator system of the vehicle, and to convert output variables of a sensor system of the vehicle into normalized input variables.

2. The control system as recited in claim 1, further comprising:
a third AI module to ascertain, based on a third set of input variables, output variables for providing a smooth transition of the first driving maneuver to the second driving maneuver.

3. The control system as recited in claim 1, wherein the interface layer is a further AI module.

4. The control system as recited in claim 1, wherein at least one of: (i) at least one AI module of the at least one AI module is integrated in a sensor assembly that provides the input variables of the AI module, and (ii) at least one AI module of the at least one AI module is integrated in an actuator assembly that receives the output variables of the AI module.

5. The control system as recited in claim 1, wherein the at least one AI module includes at least two AI modules, which at least one of: (i) supply output variables for carrying out one and the same driving maneuver, and (ii) recognize one and the same object or one and the same group of objects, the input variables of the at least two AI modules being different.

6. The control system as recited in claim 1, wherein the totality of the objects to be recognized by the control system are divided between AI modules of the at least one AI module so that a recognition of a first object by a first AI module is contradictory to a recognition of a second object by a second AI module.

7. The control system as recited in claim 1, wherein at least one communication interface is for acquiring the parameters of the processing chain for at least one of the at least one AI module from another vehicle or from an external computer.

8. The control system as recited in claim 1, wherein at least one of the at least one AI module includes an artificial neural network (ANN).

9. The control system as recited in claim 1, wherein AI modules of the at least one AI module are implemented on a distributed computing architecture in the vehicle.

10. A method for producing a control system for an autonomous vehicle, the method comprising:
transferring training values of input variables and training values of output variables for at least one of the at least one AI module from the vehicle to at least one of an external computer outside the vehicle, and another vehicle; and ascertaining parameters of a parameterized internal processing chain for the AI module are ascertained at the external computer or at the other vehicle;

wherein the control system includes at least one artificial intelligence (AI) module to convert the input variables into the output variables through the parameterized internal processing chain, parameters of the processing chain being capable of being configured, in a training phase, so that the training values of the input variables are converted into the training values of the output variables, wherein the at least one AI module includes at least one of: (i) at least one first AI module of the at least one AI module to supply the output variables, based on a first set of input variables, for carrying out a first driving maneuver, and a second AI module of the at least one AI module to supply the output variables, based on a second set of input variables, for carrying out a second driving maneuver, and (ii) at least one first AI module to recognize a first object or a first group of objects and a second AI module to recognize a second object or a second group of objects;

wherein the at least one AI module includes one of: (a) at least one AI module, or (b) at least one group of AI modules, which is configured to convert normalized input variables into normalized output variables, and wherein there is an interface layer to convert normalized output variables into input variables of an actuator system of the vehicle, and to convert output variables of a sensor system of the vehicle into normalized input variables.

11. A non-transitory machine-readable memory medium, on which is stored a computer program containing machine-readable instructions, which are executable on a computer and/or on a control system, comprising:

a program code arrangement having program code for upgrading the computer and/or the control system to a control system for an autonomous vehicle, wherein the control system includes at least one artificial intelligence (AI) module to convert input variables into output variables through a parameterized internal processing chain, parameters of the processing chain being configurable, in a training phase, so that training values of the input variables are converted into the corresponding training values of the output variables, wherein the at least one AI module includes at least one of: (i) at least one first AI module of the at least one AI module to supply output variables, based on a first set of input variables, for carrying out a first driving maneuver, and a second AI module of the at least one AI module to supply output variables, based on a second set of input variables, for carrying out a second driving maneuver, and (ii) at least one first AI module to recognize a first object or a first group of objects and a second AI module to recognize a second object or a second group of objects, by performing the following:

converting the input variables into the output variables through the parameterized internal processing chain;

converting the training values of the input variables into the corresponding training values of the output variables;

supplying the output variables for carrying out the first driving maneuver;

supplying the output variables for carrying out the second driving maneuver;

recognizing the first object or the first group of objects; and recognizing the second object or the second group of objects;

wherein the at least one AI module includes one of: (a) at least one AI module, or (b) at least one group of AI modules, which is configured to convert normalized input variables into normalized output variables, and wherein there is an interface layer to convert normalized output variables into input variables of an actuator system of the vehicle, and to convert output variables of a sensor system of the vehicle into normalized input variables.

12. A non-transitory machine-readable memory medium, on which is stored a computer program containing machine-readable instructions, which are on a computer and/or on a control system, comprising:

a program code arrangement having program code for causing the computer and/or control system for producing a control system for an autonomous vehicle; wherein the control system includes at least one artificial intelligence (AI) module to convert input variables into output variables through a parameterized internal processing chain, parameters of the processing chain being capable of being configured, in a training phase, so that training values of the input variables are converted into the corresponding training values of the output variables, wherein the at least one AI module includes at least one of: (i) at least one first AI module of the at least one AI module to supply output variables, based on a first set of input variables, for carrying out a first driving maneuver, and a second AI module of the at least one AI module to supply output variables, based on a second set of input variables, for carrying out a second driving maneuver, and (ii) at least one first AI module to recognize a first object or a first group of objects and a second AI module to recognize a second object or a second group of objects, by performing the following:

transferring training values of the input variables and training values of the output variables for at least one of the at least one AI module from the vehicle to at least one of an external computer outside the vehicle, and another vehicle; and ascertaining the parameters of the processing chain for the AI module, wherein the parameters are ascertained at the external computer or at the other vehicle;

wherein the at least one AI module includes one of: (a) at least one AI module, or (b) at least one group of AI modules, which is configured to convert normalized input variables into normalized output variables, and wherein there is an interface layer to convert normalized output variables into input variables of an actuator system of the vehicle, and to convert output variables of a sensor system of the vehicle into normalized input variables.

* * * * *